Oct. 26, 1965        A. S. STERN ETAL        3,213,642
SLIP-ON COUPLING WITH OVERLOAD RING
Filed March 18, 1963
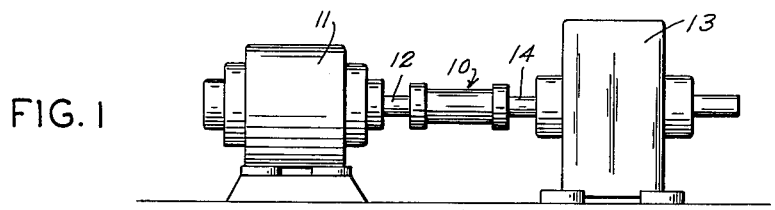
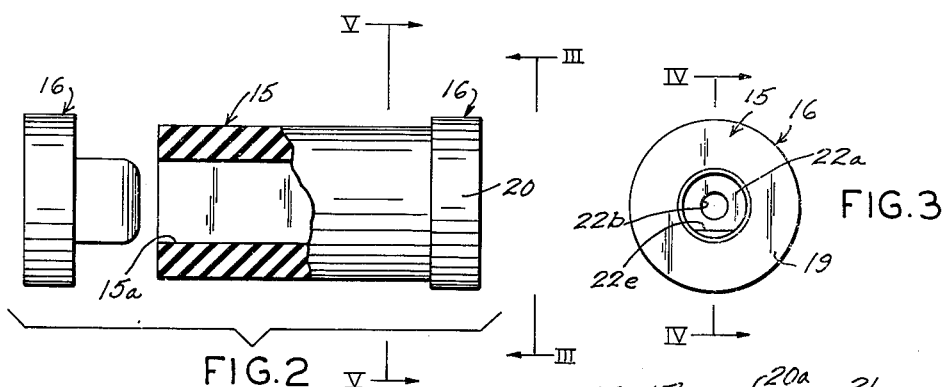
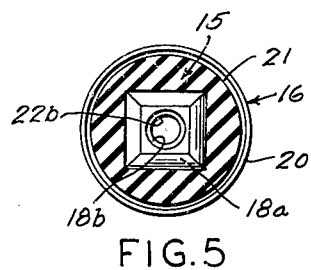
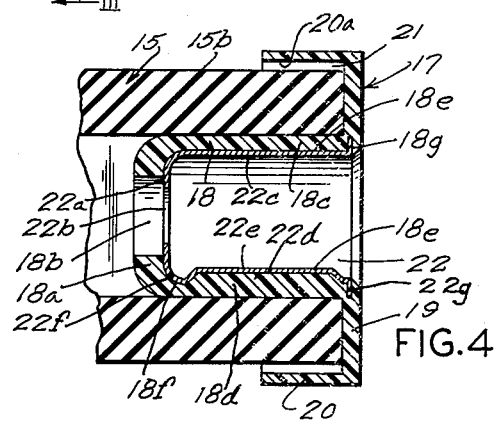
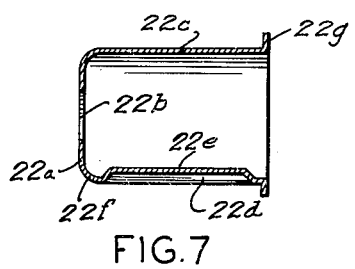
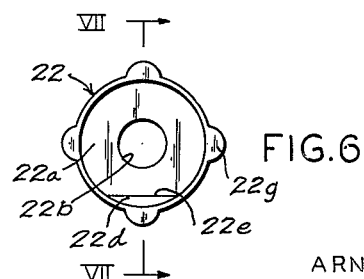
INVENTORS
ARNOLD S. STERN
BENJAMIN B. STERN
BY
Hill, Sherman, Meroni, Gross & Simpson
ATTORNEYS

3,213,642
SLIP-ON COUPLING WITH OVERLOAD RING
Arnold S. Stern and Benjamin B. Stern, both of
8031 S. Eberhart Ave., Chicago, Ill.
Filed Mar. 18, 1963, Ser. No. 265,820
12 Claims. (Cl. 64—11)

The present invention relates generally to flexible shaft coupling structures. More specifically, the present invention constitutes an improvement on the invention disclosed in U.S. Patent 2,908,150 granted to Benjamin B. Stern on October 13, 1959. The improvements disclosed herein are provided to decrease wear on the bushing and to decrease wear on the flexible sleeve.

According to an important object of this invention, there is provided an overload collar on the bushing to protect the rubber sleeve from excessive distention when subjected to torque exceeding the rated capacity of the coupling, and which tends to place extraordinary strain on the rubber sleeve.

According to still other important objects of this invention, there is provided a metal cup which is locked in assembly with the bushing and adapted to engage directly with a metal shaft to be coupled therewith in order to reduce wear on the bushing.

The flexible shaft coupling structure described in the aforesaid patent is suitable for general use. At times, however, in a coupled motor-driven unit, there may be transient conditions resulting in loads higher than the normal rated capacity of both coupling and motor. There are a number of conditions which can cause an overload such as a particle being caught in pump gears, an obstruction in the pump piping, or a rusted pump impeller, which represent a few typical examples.

Inasmuch as the commercial rating of electric motors is nominal, in that any electric motor will briefly deliver much higher torque on demand than its indicated rating, a condition occurs wherein the load for this unexpected and transient period will greatly exceed the anticipated load and place a strain on the coupling in considerable excess of the rated capacity.

Where the load is greatly increased, damage can occur to the sleeve as a result of excessive distention of the sleeve to a point where driving relationship may be lost, or the sleeve itself may be damaged.

According to this invention, the bushing has a radial flange provided with an axially extending collar at its outer end which overlies the bushing and encircles the end of the sleeve. Excellent results may be obtained where the collar extends axially of the bushing, a distance approximately one half the length of the encased bushing portion. The collar has a diameter in excess of the diameter of the sleeve and an annular recess or gap is disposed between the collar and the sleeve so that in normal use or even in normal overload condition, there is no interference with the displacement of the sleeve, as described in the aforesaid patent.

Should, however, a momentary condition occur, as described previously, in which there is undue transient overload exceeding the rated capacity of the coupling, the overload collar provides means limiting further and excessive distention of the rubber sleeve and thus enables the coupling to operate during this transient period. It will be appreciated the overload collar becomes operative only after the normal overload of the sleeve has been exceeded, and after the coupling has performed its unique function of absorbing and dissipating shock load, since the rubber sleeve is unconfined at its periphery during normal load and overload conditions.

It is still another important object of this invention to provide a new and improved bushing structure which is better able to resist stress and wear during prolonged use.

The bushing structure disclosed herein comprises a synthetic plastic bushing having a metal bushing or liner disposed in its bore. In previous couplings having a D-shaped bore telescoping the drive shafts, the stress and wear on the bushing required a plastic of exceptional strength and resistance to abrasion. The only practical commercially available plastic having attributes approaching these necessary qualities is the polymides, or nylon as it is known commercially. Due to the fact that nylon is hygroscopic, a bushing made from this material has a tendency to absorb and discharge moisture depending upon ambient conditions causing a continuous cycle of dimensional change in the bushing. Where a properly sized plastic bushing is telescoped on a shaft, the bushing may become loose on the shaft when subjected to dry conditions, or when the bushing is charged with moisture, the bushing will swell and seize the drive shaft. By providing the synthetic plastic bushing with a liner or insert bushing made from a hard material such as low carbon steel, the fit between the drive shaft and the bushing structure may be maintained in the desired condition.

By providing a bushing structure having a steel liner or socket within the plastic bushing, there is a great increase in the resistance to wear and abrasion caused by the constant movement of the shaft within the bore of the bushing, thus eliminating the major cause of coupling failure which is a tendency for the shaft to nibble-out the driving means or flat of the bushing.

Still another important advantage of employing a hard metal liner within the plastic bushing is in the stabilization of the size of the bore of the bushing that is to be fitted on to the drive shaft.

Yet another advantage of the instant bushing structure lies in the fact that the steel socket member reinforces and strengthens the bushing assembly and removes the limitations on the selection of the type of plastic that may be employed. Many plastics which lack the high strength and abrasion resistance of nylon have specific attributes which form an improvement for applications of this type. As an example, where the bushing is made from polypropylene the cost of the bushing may be materially reduced and the hyroscopic factor is virtually eliminated.

According to the present invention, the bushing is preferably made from polypropylene which costs about half as much as nylon, and reduces the hygroscopic effect to a negligible factor.

A further advantage of providing a bushing structure including a plastic bushing having a metal liner is that the tendency for the shaft to dig into the plastic where directly engaged against the plastic is now eliminated. By providing the metal liner, free lateral floating movement of the shaft in the bushing is insured. The endwise movement of the shaft with respect to the bushing is necessary in the operation of many units to allow the motor rotor to operate on its electrical center without placing undue pressure on bearings or delicate shaft seals of the pump.

Still another important advantage of the herein disclosed bushing structure is that the plastic bushing provides means for precluding any tendency of ringing or resonance in the metal-to-metal connection made by the steel drive shaft and the metal liner or bushing.

According to still other important objects of this invention there is provided a new and improved technique for locking a metal liner or bushing in a bore of a plastic bushing.

Still another object of this invention is to provide a new and improved metal bushing or liner which can be used in a plastic molding process whereby the outer plastic bushing can be conveniently molded on to the metal liner or bushing.

Other objects and features of this invention will more fully become apparent in view of the following detailed description taken in conjunction with the accompanying drawings illustrating a single embodiment and in which:

FIGURE 1 is a side elevation of a shaft coupling structure coupled to a motor and a speed reducer;

FIGURE 2 is an enlarged partially fragmentary and partially exploded view of the shaft coupling structure;

FIGURE 3 is an end view of the shaft coupling structure as shown on the line III—III looking in the direction indicated by the arrows in FIGURE 2;

FIGURE 4 is an enlarged fragmentary vertical section taken substantially on the line IV—IV looking in the direction indicated by the arrows as seen in FIGURE 3;

FIGURE 5 is an enlarged vertical section taken on the line V—V looking in the direction indicated by the arrows as shown in FIGURE 2;

FIGURE 6 is an enlarged end view of a metal liner or bushing; and

FIGURE 7 is a vertical section taken substantially on the line VII—VII looking in the direction indicated by the arrows as seen in FIGURE 6.

As shown on the drawings:

According to the present invention, a flexible coupling structure 10 has been provided for connecting a motor 11 through its drive shaft 12 to a speed reducer 13. It will be seen in FIGURE 1 that the speed reducer 13 has a shaft 14 which is coupled to the motor drive shaft 12 by means of the flexible shaft coupling structure 10.

The flexible coupling structure 10 includes a flexible tubular sleeve 15 which may be made of any suitable material such as rubber and the like. The sleeve 15 has a square-shaped tubular sleeve bore 15a as well as a circular outside surface area 15b.

Mounted upon the sleeve at opposite ends is a pair of bushing structures each indicated generally at 16. Since the bushing structures are identical, only one of them will be described in detail hereafter. Each bushing structure 16 includes a headed bushing 17 having a shank portion 18, a radially outwardly extending bushing flange or head portion 19, and an axially extending collar or flange 20. The bushing 17 may be made from any suitable material such as nylon, polypropylene, and the like as previously discussed herein.

The collar 20 is spaced from the outside surface 15b of the sleeve 15 and an annular gap 21 is disposed therebetween. The distance between the outside surface of the sleeve 15b and the inside surface 20a of the collar 20 is of a distance sufficient to permit the sleeve 15 to flex radially outwardly during normal operating conditions. However, where the coupling 10 is excessively loaded, the collar flange 20 acts as a stop to restrict excessive distortion of the material of the sleeve 15 and to insure that relative rotation will not occur between the drive shaft and the sleeve 15.

The shank portion 18 of the bushing 17 includes a bottom 18a having a hole 18b therein. The shank portion 18 further includes a shank side wall 18c which is defined by a square-shaped outside configuration corresponding to the configuration of the bore 15a of the sleeve 15.

The corners of the shank side wall 18c are engaged with the corners of the bore 15a as shown in the aforesaid patent, and as shown in FIGURE 5.

The shank portion 18 further includes a thickened side wall portion 18d which provides means for locking the liner 22 with the bushing 17 as will hereafter be further discussed. The thickened portion 18d has a flat surface 18e which is snugly engaged against an outside surface of the liner 22. The axially outer end of the shank portion 18 is provided with circumferentially spaced tab or prong locking grooves 18g.

Disposed within the central area defined by the shank portion 18 is a cup-shaped metal insert liner or bushing or cup 22. The liner has a bottom 22a with a hole 22b disposed therein in axial alignment with the hole 18b in the bottom of the shank portion 18. By providing aligned axial holes in the bottoms of the bushing and the liner, a shaft such as shaft 12 may be inserted into the socket theredefined and withdrawn therefrom very readily as the holes provide means for preventing vacuum pressures from developing between the bottoms of the bushing 17 and the liner 22 with respect to the shaft disposed in the socket.

The liner 22 further includes a tubular side wall 22c which is nestingly engaged with the inside surface area or central area of the shank portion 18. In order to lock the shank portion 18 with the liner 22, the liner 22 is provided with a radially inwardly bulged area 22d defining a radially outwardly opening groove with the material of the shank portion 18 being disposed internally of the groove. An upper surface or flat portion 22e of the bulged area 22d is provided for engagement with a corresponding flat portion on a shaft to be engaged within the shank portion 18. Due to the fact that a bulged simulating portion 22f is disposed axially behind the bulged area 22d, and further due to the use of locking tabs or prongs 22g engaged in the locking grooves 18g, axial pull-out of the liner 22 from the central area of the shank portion 18 is prevented. The tabs 22g extend radially outwardly and are circumferentially spaced with respect to one another as shown in FIGURE 6 and are engaged within the locking grooves 18g as shown in FIGURE 4.

A further advantage of this invention is that a bushing assembly may be economically manufactured so as to utilize the inherent strength and wear resistance of steel combined with the intricacy of shape available in plastic molding for the reasons set forth above.

Excellent results may be obtained where the liner is drawn from low carbon sheet steel which work hardens during the drawing process. In the present form of the invention, the sheet metal is of 26 gauge or 0.18" thick. The liner 22 is drawn to a tubular shape with enough clearance to make a close sliding fit upon a selected shaft size. The rear wall is closed, except for the hole to prevent air bind during assembly and insertion of the telescoping drive shaft. A side of the socket defined by the liner 22 is flat to insure a proper grip between the liner and a drive shaft. The inside wall surfaces of the socket defined by a liner may be surface hardened by a process such as cyanide hardening and then the surface may be plated.

In the illustrated embodiment, the inside diameter of the collar flange 20 is six percent greater than the outside diameter of the sleeve 15. This allows for a standard tolerance of three percent oversize variation in the 1⅛" diameter extruded rubber, with the remainder of the annular gap accommodating the distention and enlargement of the rubber body during normal operation and normal overload conditions as described in the aforesaid patent. The oversize may amount to a maximum of two or three percent of the rubber sleeve diameter 15. The one percent tolerance in planned enlargement represents allowance for variations in the durometer of the rubber sleeve 15. The collar flange 20 is formed so as to have a length of less than one half the effective length of the shank portion.

Although minor modifications might be suggested by those versed in the art, it should be understood that we wish to embody within the scope of the patent warranted hereon, all such modifications as reasonably and properly come within the scope of our contribution to the art.

We claim as our invention:

1. In a flexible coupling structure, a tubular sleeve including a radially outer sleeve surface area which sleeve is comprised of a suitable deflectable elastomeric material, the sleeve having an internal tubular wall area provided with angular sleeve corners, and means at the opposite ends of the sleeve for effecting connections with members to be coupled, at least one of said means being a headed bushing which has a shank portion telescopingly engaged with said tubular wall area and a head portion, the bushing having a central area for receipt of a shaft, the head portion being in abutment with an end of the sleeve leaving the radially outer surface area of the sleeve free of the bushing and its head portion, the shank portion having its external surface area provided with angular bushing corners in abutting engagement with the angular sleeve corners, the sleeve material at the area of the angular sleeve corners being displaceable radially outwardly upon the twisting of the sleeve and the bushing with respect to one another to damp the transmission of vibration from a drive shaft through the coupling structure, the sleeve functioning as a non-linear hard spring in that resistance to continued displacement of the sleeve material at the corners increases at a proportionately higher rate than the stress imposed by the load of the shaft, said headed bushing having an axially extending annular collar spaced radially from an outside perimeter of said tubular sleeve, the collar being spaced from said sleeve except during transient overloads exceeding the normal rated capacity of the tubular sleeve.

2. The flexible coupling structure of claim 1 further characterized by a central area of the bushing having an insert cup locked therein, the bushing being comprised of a synthetic plastic material and the insert cup being comprised of metal to reduce wear on the bushing.

3. In a flexible coupling structure for use with a shaft having a shaft flat, a tubular sleeve comprised of a suitable deflectable elastomeric material, the sleeve having an internal tubular square-shaped wall area provided with angular sleeve corners, and means at the opposite ends of the sleeve for effecting connections with members to be coupled, at least one of said means being a headed bushing which has a shank portion telescopingly engaged with said tubular wall area, the bushing having a central area of generally D-shaped configuration for receipt of a shaft and which central area has a bushing flat for co-action with a shaft flat, the shank portion having an external square-shaped surface area provided with angular bushing corners in abutting engagement with the angular sleeve corners, the sleeve material at the area of the angular sleeve corners being displaceable radially outwardly upon the engagement of the radially spaced bushing and shaft flats and the twisting of the engaged bushing and shaft flats with respect to the sleeve to damp the shearing force transmitted by a shaft flat to the bushing flat to prolong the useful life of the bushing while simultaneously dampening the transmission of vibration from a drive shaft through the coupling structure, said headed bushing having an axially extending annular collar spaced radially from an outside perimeter of said tubular sleeve, the collar being spaced from said sleeve except during transient overloads exceeding the normal rated capacity of the tubular sleeve.

4. The structure of claim 3 further characterized by said headed bushing being comprised of a synthetic plastic material and having a cup-shaped metal liner disposed in its central area for engagement with a shaft, said headed bushing and said cup-shaped liner having axially aligned openings in respective bottoms to permit a shaft to be inserted into and removed from a bore of said liner without the development of a vacuum.

5. The structure of claim 3 further characterized by said liner being comprised of work hardened steel.

6. In a flexible coupling structure for use with a shaft having a shaft flat, a tubular sleeve comprised of a suitable deflectable elastomeric material, the sleeve having an internal tubular square-shaped wall area provided with angular sleeve corners, and means at the opposite ends of the sleeve for effecting connections with members to be coupled, at least one of said means being a headed bushing which has a shank portion telescopingly engaged with said tubular wall area, the bushing having a central area of generally D-shaped configuration for receipt of a shaft and which central area has a bushing flat for co-action with a shaft flat, the shank portion having an external square-shaped surface area provided with angular bushing corners in abutting engagement with the angular sleeve corners, the sleeve material at the area of the angular sleeve corners being displaceable radially outwardly upon the engagement of the radially spaced bushing and shaft flats and the twisting of the engaged bushing and shaft flats with respect to the sleeve to damp the shearing force transmitted by a shaft flat to the bushing flat to prolong the useful life of the bushing while simultaneously dampening the transmission of vibration from a drive shaft through the coupling structure, said headed bushing having an axially extending annular collar spaced radially from an outside perimeter of said tubular sleeve, the collar being spaced from said sleeve except during transient overloads exceeding the normal rated capacity of the tubular sleeve, said bushing being comprised of a synthetic plastic material and having a metal liner disposed in its central area for engagement with a shaft, the liner having circumferentially spaced radially outwardly extending prongs embedded in a head portion of said headed bushing in locked assembly to prevent relative circumferential and axial movement between said bushing and said liner.

7. In a flexible coupling structure for use with a shaft having a shaft flat, a tubular sleeve comprised of a suitable deflectable elastomeric material, the sleeve having an internal tubular square-shaped wall area provided with angular sleeve corners, and means at the opposite ends of the sleeve for effecting connections with members to be coupled, at least one of said means being a headed bushing which has a shank portion telescopingly engaged with said tubular wall area, the bushing having a central area of generally D-shaped configuration for receipt of a shaft and which central area has a bushing flat for co-action with a shaft flat, the shank portion having an external square-shaped surface area provided with angular bushing corners in abutting engagement with the angular sleeve corners, the sleeve material at the area of the angular sleeve corners being displaceable radially outwardly upon the engagement of the radially spaced bushing and shaft flats and the twisting of the engaged bushing and shaft flats with respect to the sleeve to damp the shearing force transmitted by a shaft flat to the bushing flat to prolong the useful life of the bushing while simultaneously dampening the transmission of vibration from a drive shaft through the coupling structure, said headed bushing having an axially extending annular collar spaced radially from an outside perimeter of said tubular sleeve, the collar being spaced from said sleeve except during transient overloads exceeding the normal rated capacity of the tubular sleeve, said bushing being comprised of a synthetic plastic material and having a metal liner disposed in its central area for engagement with a shaft, the liner having circumferentially spaced radially outwardly extending prongs embedded in a head portion of said headed bushing in locked assembly to prevent relative circumferential and axial movement between said bushing and said liner, said liner having a radially inwardly bulged area with the material of said headed bushing being engaged in a groove defined at a radially outer side of said bulged area further locking the liner with said bushing.

8. In a flexible coupling structure for use with a shaft having a shaft flat, a tubular sleeve comprised of a suitable deflectable elastomeric material, the sleeve having an internal tubular square-shaped wall area provided with angular sleeve corners, and means at the opposite ends of the sleeve for effecting connections with members to be coupled, at least one of said means being a headed bushing which has a shank portion telescopingly engaged with said tubular wall area, the bushing having a central area of generally D-shaped configuration for receipt of a shaft and which central area has a bushing flat for coaction with a shaft flat, the shank portion having an external square-shaped surface area provided with angular bushing corners in abutting engagement with the angular sleeve corners, the sleeve material at the area of the angular sleeve corners being displaceable radially outwardly upon the engagement of the radially spaced bushing and shaft flats and the twisting of the engaged bushing and shaft flats with respect to the sleeve to damp the shearing force transmitted by a shaft flat to the bushing flat to prolong the useful life of the bushing while simultaneously dampening the transmission of vibration from a drive shaft through the coupling structure, said headed bushing having an axially extending annular collar spaced radially from an outside perimeter of said tubular sleeve, the collar being spaced from said sleeve except during transient overloads exceeding the normal rated capacity of the tubular sleeve, said bushing being comprised of a synthetic plastic material and having a metal liner disposed in its central area for engagement with a shaft, the liner having circumferentially spaced radially outwardly extending prongs embedded in a head portion of said headed bushing in locked assembly to prevent relative circumferential and axial movement between said bushing and said liner, said liner having a radially inwardly bulged area with the material of said headed bushing being engaged in a groove defined at a radially outer side of said bulged area further locking the liner with said bushing, said bulged area providing a flat surface for engagement with a shaft flat.

9. A bushing structure comprising a headed bushing having a shank portion for telescoping engagement within a tubular wall area of a flexible sleeve and which also has a head portion, the bushing having a central area for receipt of a shaft, the head portion being sized for abutment with an end of a flexible sleeve and for leaving the radially outer surface area of the sleeve free of the head portion, the shank portion having its external surface area provided with angular bushing corners for abutting engagement with angular sleeve corners provided in a bore of a flexible sleeve, said headed bushing having an axially extending annular collar sized so as to be spaced from the bushing corners on the external surface area of a flexible sleeve, the collar being sized so as to be spaced from a flexible sleeve except during transient overloads exceeding its normal rated capacity, said headed bushing being comprised of a synthetic plastic material and having a cup-shaped metal liner disposed in its central area for engagement with a shaft, the liner having circumferentially spaced radially outwardly extending prongs embedded in a head portion of said headed bushing in locked assembly to prevent relative circumferential and axial movement between said bushing and said liner, the prongs being extended radially outwardly from a generally axially outer end of said cup-shaped bushing remote from its bottom end.

10. A bushing structure comprising a headed bushing having a shank portion for telescoping engagement within a tubular wall area of a flexible sleeve and which also has a head portion, the bushing having a central area for receipt of a shaft, the head portion being sized for abutment with an end of a flexible sleeve and for leaving the radially outer surface area of the sleeve free of the head portion, the shank portion having its external surface area provided with angular bushing corners for abutting engagement with angular sleeve corners provided in a bore of a flexible sleeve, said headed bushing having an axially extending annular collar sized so as to be spaced from the bushing corners on the external surface area of a flexible sleeve, the collar being sized so as to be spaced from a flexible sleeve except during transient overloads exceeding its normal rated capacity, said headed bushing being comprised of a synthetic plastic material and having a metal liner disposed in its central area for engagement with a shaft, the liner having circumferentially spaced radially outwardly extending prongs embedded in a head portion of said headed bushing in locked assembly to prevent relative circumferential and axial movement between said bushing and said liner, said liner having a radially inwardly bulged area with the material of said headed bushing being engaged in a groove defined at a radially outer side of said bulged area further locking the liner with said bushing.

11. A bushing structure comprising a headed bushing having a shank portion for telescoping engagement within a tubular wall area of a flexible sleeve and which also has a head portion, the bushing having a central area for receipt of a shaft, the head portion being sized for abutment with an end of a flexible sleeve and for leaving the radially outer surface area of the sleeve free of the head portion, the shank portion having its external surface area provided with angular bushing corners for abutting engagement with angular sleeve corners provided in a bore of a flexible sleeve, said headed bushing having an axially extending annular collar sized so as to be spaced from the bushing corners on the external surface area of a flexible sleeve, the collar being sized so as to be spaced from a flexible sleeve except during transient overloads exceeding its normal rated capacity, said headed bushing being comprised of a synthetic plastic material and having a cup-shaped metal liner disposed in its central area for engagement with a shaft, the liner having circumferentially spaced radially outwardly extending prongs embedded in a head potrion of said headed bushing in locked assembly to prevent relative circumferential and axial movement between said bushing and said liner, said headed bushing and said cup-shaped liner having axially aligned openings in respective bottoms to permit a shaft to be inserted into and removed from a bore of said liner without the development of a vacuum.

12. A bushing structure comprising a headed bushing having a shank portion for telescoping engagement within a tubular wall area of a flexible sleeve and which also has a head portion, the bushing having a central area for receipt of a shaft, the head portion being sized for abutment with an end of a flexible sleeve and for leaving the radially outer surface area of the sleeve free of the head portion, the shank portion having its external surface area provided with angular bushing corners for abutting engagement with angular sleeve corners provided in a bore of a flexible sleeve, said headed bushing having an axially extending annular collar sized so as to be spaced from the bushing corners on the external surface area of a flexible sleeve, the collar being sized so as to be spaced from a flexible sleeve except during transient overloads exceeding its normal rated capacity, said headed bushing being comprised of a synthetic plastic material and having a metal liner disposed in its central area for engagement with a shaft, the liner having circumferentially spaced radially outwardly extending prongs embedded in a head portion of said headed bushing in locked assembly to prevent relative circumferential and axial movement between said bushing and said liner, said liner having a radially inwardly bulged area with the material of said headed bushing being engaged in a groove defined at a radially outer side of said bulged area further locking the liner with said bushing, said bulged area providing a flat surface for engagement with a shaft flat.

References Cited by the Examiner

UNITED STATES PATENTS

| | | |
|---|---|---|
| 1,977,876 | 10/34 | Groff. |
| 2,297,619 | 9/42 | Haberstump 64—11 |
| 2,397,626 | 4/46 | Shriver. |
| 2,586,567 | 2/52 | Scheele 64—11 |
| 2,857,749 | 10/58 | Fabbri et al. 64—11 |
| 2,908,150 | 10/59 | Stern 64—11 |
| 2,955,816 | 10/60 | Wise 64—11 |
| 2,994,213 | 8/61 | Arnold et al. 64—11 |

ROBERT C. RIORDON, *Primary Examiner.*